(12) United States Patent
Kang et al.

(10) Patent No.: US 9,654,612 B2
(45) Date of Patent: May 16, 2017

(54) WIRELESS COMMUNICATION DEVICE AND ANTENNA SEARCH METHOD THEREOF

(71) Applicant: Wistron NeWeb Corp., Hsinchu (TW)

(72) Inventors: Fu-Ming Kang, Hsinchu (TW); Chia-Hsiang Wang, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 0 days.

(21) Appl. No.: 14/957,624

(22) Filed: Dec. 3, 2015

(65) Prior Publication Data
US 2016/0219638 A1 Jul. 28, 2016

(30) Foreign Application Priority Data
Jan. 27, 2015 (TW) ................................ 104102671

(51) Int. Cl.
| | | |
|---|---|---|
| *H04B 17/10* | (2015.01) | |
| *H04B 7/08* | (2006.01) | |
| *H04M 1/725* | (2006.01) | |
| *H04W 40/06* | (2009.01) | |
| *H04M 1/24* | (2006.01) | |

(52) U.S. Cl.
CPC ..... *H04M 1/72527* (2013.01); *H04M 1/7253* (2013.01); *H04M 1/24* (2013.01); *H04W 40/06* (2013.01)

(58) Field of Classification Search
CPC H04M 1/72527; H04W 40/06; H04B 17/101; H04B 17/102; H04B 17/14; H04B 17/318; H04B 7/0608; H04B 7/0802; H04B 7/0808; H04B 7/082
See application file for complete search history.

(56) References Cited

U.S. PATENT DOCUMENTS

| | | | | |
|---|---|---|---|---|
| 7,324,837 | B2* | 1/2008 | Yamakita | H04B 7/0608 455/561 |
| 8,412,112 | B2* | 4/2013 | Foegelle | H04B 17/21 455/67.11 |
| 2009/0005121 | A1* | 1/2009 | Wong | H01Q 1/246 455/562.1 |
| 2014/0011468 | A1* | 1/2014 | Park | H04B 7/0802 455/272 |
| 2014/0357294 | A1* | 12/2014 | Rajakarunanayake | G01S 5/00 455/456.1 |
| 2015/0215054 | A1* | 7/2015 | Piazza | H04B 7/0691 455/115.1 |

* cited by examiner

*Primary Examiner* — Andrew Wendell
(74) *Attorney, Agent, or Firm* — Jianq Chyun IP Office

(57) ABSTRACT

A wireless communication device for linking to an electronic device and including at least one antenna array and a control circuit is provided. The control circuit groups the at least one antenna array to obtain a plurality of test groups. In a scanning operation, the control circuit selects one of the test groups to be a specific test group. In a setting operation, the control circuit groups the specific test group, and re-obtains the plurality of test groups according to the grouped specific test group. The control circuit searches at least one optimal antenna for linking to the electronic device from the at least one antenna array through the scanning operation and the setting operation.

10 Claims, 5 Drawing Sheets

WIRELESS COMMUNICATION DEVICE AND ANTENNA SEARCH METHOD THEREOF

CROSS-REFERENCE TO RELATED APPLICATION

This application claims the priority benefit of Taiwan application serial no. 104102671, filed on Jan. 27, 2015. The entirety of the above-mentioned patent application is hereby incorporated by reference herein and made a part of this specification.

BACKGROUND OF THE INVENTION

Field of the Invention

The invention relates to an electronic device and an operation method thereof, and particularly to a wireless communication device and an antenna search method thereof.

Description of Related Art

Smart antenna comprises antenna arrays, and is widely applied in various types of wireless communication systems. For example, FIG. 1 is a schematic view illustrating an application of a smart antenna on a wireless local area network (WLAN). As shown in FIG. 1, the smart antenna comprises one antenna array, and the antenna array comprises eight antennas 11-18. When an electronic device 10 enters a reading range of the antenna array, a router 120 in the wireless local area network establishes a wireless transmission with the electronic device 10 sequentially through the antennas 11-18 in the antenna array, and selects one of the antennas 11-18 to be an optimal antenna for linking to the electronic device 10 according to signals returned by the electronic device 10.

In other words, the router 120 performs 8 search operations to search the optimal antenna for linking to the electronic device 10. Similarly, when the smart antenna includes 4 antenna arrays, and each of antenna arrays includes 8 antennas, the number of times of search operations required for the router 120 to search the optimal antenna for linking to the electronic device 10 is 4096 (i.e., 8×8×8×8). Namely, conventional antenna search method leads the router 120 to consume a lot of time to search optimal antennas for linking to the electronic device 10 from the antenna arrays, thereby increasing the burden of the router 120.

SUMMARY OF THE INVENTION

The invention provides a wireless communication device and an antenna search method thereof to shorten a search time of an antenna through a scanning operation and a setting operation, thereby reducing the burden of the wireless communication device.

A wireless communication device of the invention is suitable for linking to an electronic device and includes at least one antenna array and a control circuit. The control circuit is coupled to the at least one antenna array and groups the at least one antenna array to obtain a plurality of test groups. In addition, in a scanning operation, the control circuit selects one of the plurality of test groups to be a specific test group. In a setting operation, the control circuit groups the specific test group, and re-obtains the plurality of test groups according to the grouped specific test group. Furthermore, the control circuit searches at least one optimal antenna for linking to the electronic device from the at least one antenna array through the scanning operation and the setting operation.

An antenna search method of the invention includes the following steps: grouping at least one antenna array to obtain a plurality of test groups; performing a scanning operation to select one of the plurality of test groups to be a specific test group; performing a setting operation to group the specific test group and re-obtain the plurality of test groups according to the grouped specific test group; and, searching at least one optimal antenna from the at least one antenna array through the scanning operation and the setting operation.

In view of the above, the invention selects a specific test group from a plurality of test groups through a scanning operation, and groups the specific test group through a setting operation to re-obtain the plurality of test groups. Accordingly, at least one optimal antenna for linking to an electronic device is searched from at least one antenna array through a scanning operation and a setting operation, thereby facilitating to shorten a search time of a wireless communication device and further reducing the burden of the wireless communication device.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
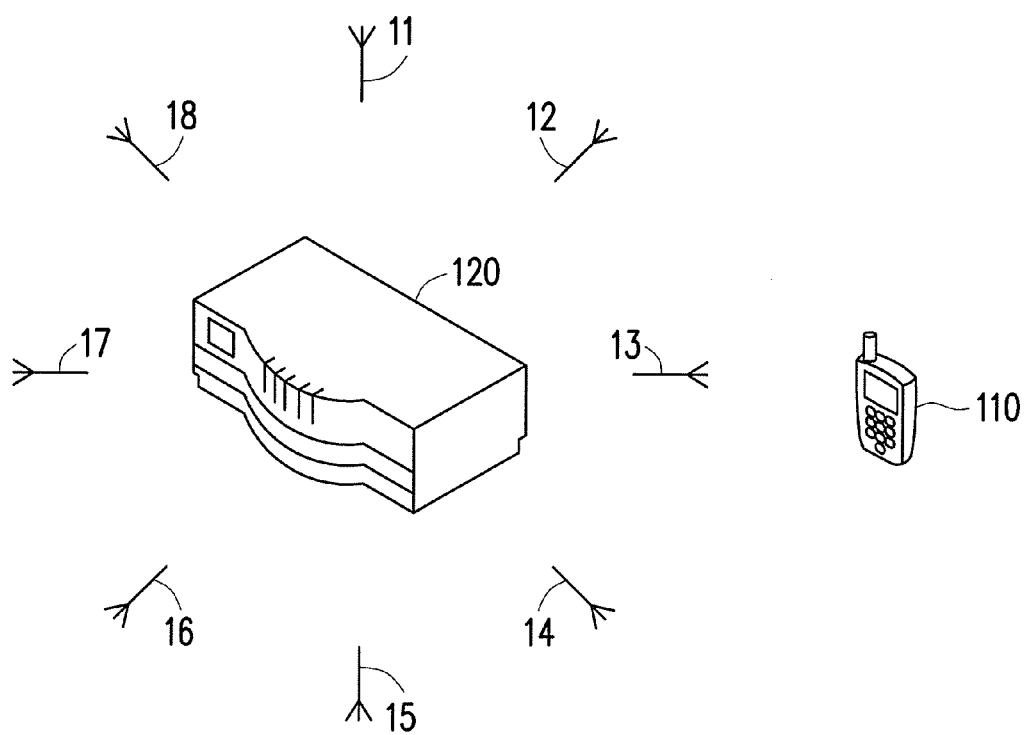
FIG. 1 is a schematic view illustrating an application of a smart antenna on a wireless local area network (WLAN).

Reference will now be made in detail to the present preferred embodiments of the invention, examples of which are illustrated in the accompanying drawings. Wherever possible, the same reference numbers are used in the drawings and the description to refer to the same or like parts.

Figure 2:
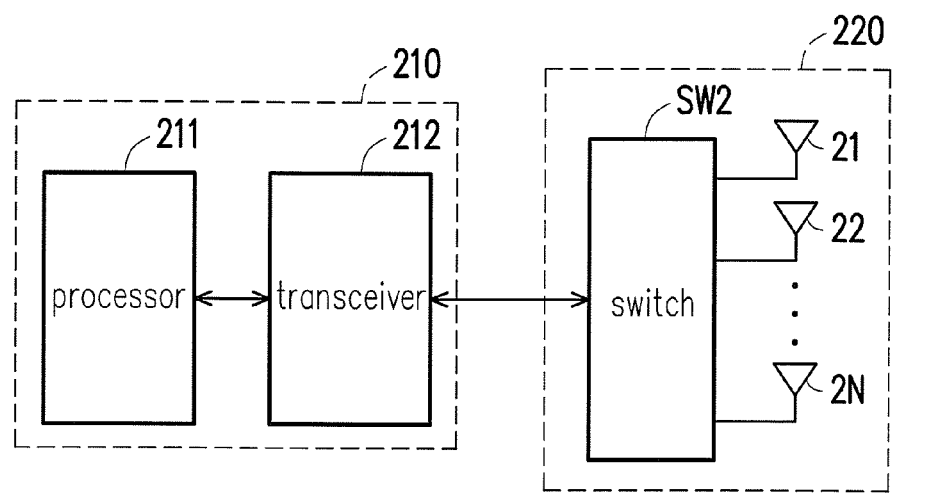
FIG. 2 is a schematic view illustrating a wireless communication device according to an embodiment of the invention.

FIG. 2 is a schematic view illustrating a wireless communication device according to an embodiment of the invention. As shown in FIG. 2, a wireless communication device 200 includes a control circuit 210 and an antenna array 220. The control circuit 210 includes a processor 211 and a transceiver 212, and the antenna array 220 includes a switch SW2 and a plurality of antennas 21-2N. In an embodiment, the wireless communication device 200 may be, for example, a router, and may establish a wireless transmission or a wireless connection with an external electronic device (not shown) through the antenna array 220. In addition, during a process of establishing the wireless transmission or the wireless connection, the wireless communication device 200 searches an optimal antenna for linking or connecting to the electronic device from the antenna array 220 so as to obtain preferable reception quality and minimize interference between signals.

Figure 3:
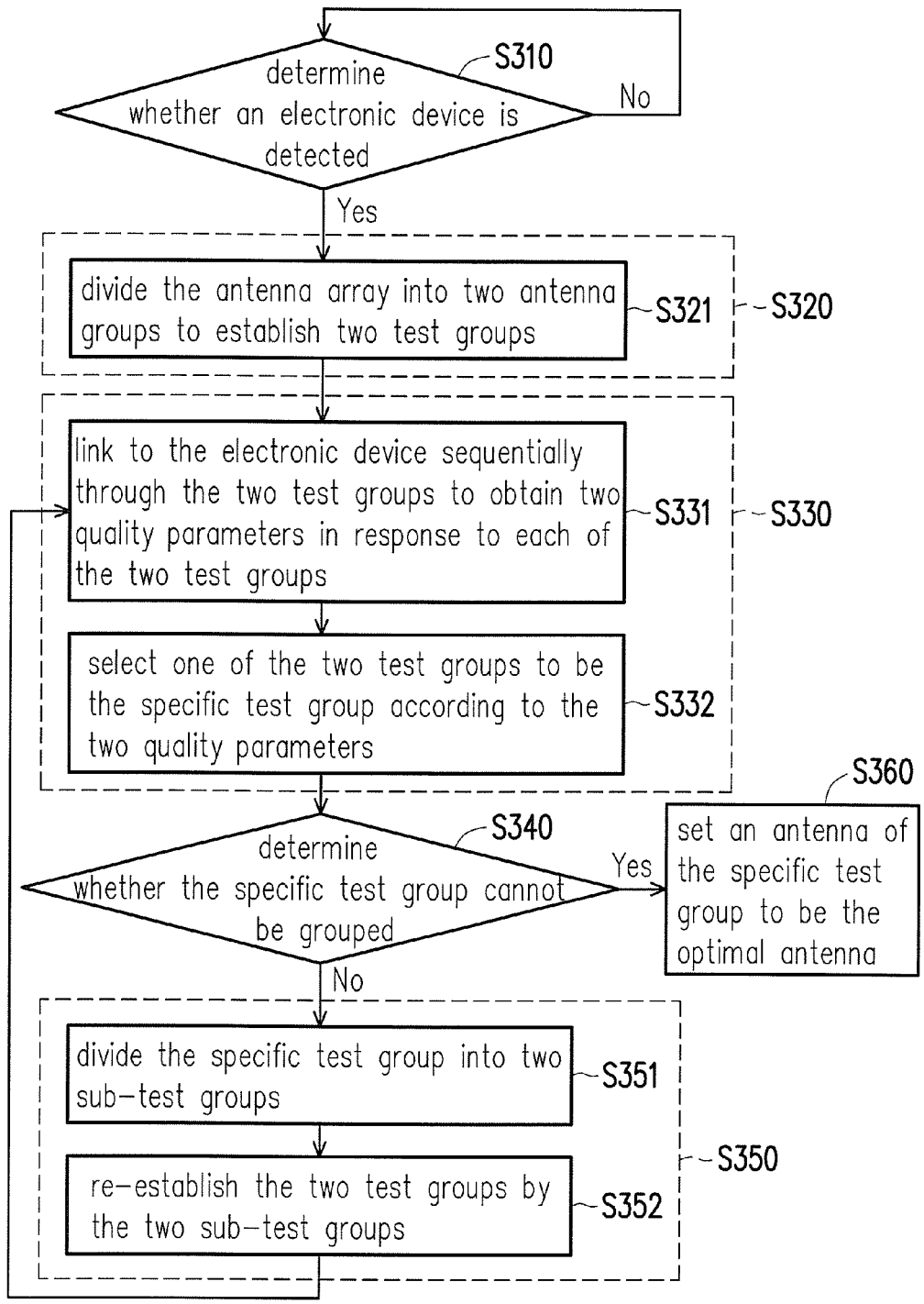
FIG. 3 is a flow chart illustrating an antenna search method according to an embodiment of the invention.

For example, FIG. 3 is a flow chart illustrating an antenna search method according to an embodiment of the invention, and an operation of the wireless communication device 200 is further described with reference to FIG. 2 and FIG. 3. As shown in step S310, the wireless communication device 200 determines whether an electronic device is detected. For example, when the electronic device enters a reading range of the antenna array 220, the wireless communication device 200 may detect the presence of the electronic device. By contrast, when the electronic device does not enter the reading range of the antenna array 220, the wireless communication device 200 cannot detect the presence of the electronic device.

When the wireless communication device 200 detects the presence of the electronic device, as shown in step S320, the control circuit 210 groups at least one antenna array to obtain a plurality of test groups. For example, in an embodiment, the antenna array may, for example, include 8 antennas 21-28. In addition, in terms of a detailed step of the step S320, as shown in step S321, the control circuit 210 divides the antenna array 220 into two antenna groups, such as an antenna group {21, 22, 23, 24} including the antennas 21-24 and an antenna group {25, 26, 27, 28} including the antennas 25-28. Furthermore, the control circuit 210 establishes two test groups by using the two antenna groups. Namely, the two antenna groups {21, 22, 23, 24} and {25, 26, 27, 28} are set to be two test groups.

Moreover, as shown in step S330, the control circuit 210 performs a scanning operation. In addition, in the scanning operation, the control circuit 210 adopts the plurality of test groups for linking to the electronic device, and selects one of the test groups to be a specific test group. For example, the transceiver 212 selects the plurality of test groups one by one through at least one switch so as to link to the electronic device through the plurality of test groups one by one. Furthermore, the processor 211 reads signals from the transceiver 212 so as to select one of the plurality of test groups to be the specific test group.

As to the detailed steps of the step S330, as shown in step S331, the control circuit 210 links to the electronic device sequentially through the two test groups {21, 22, 23, 24} and {25, 26, 27, 28}. For example, the transceiver 212 may, first, be electrically connected to the test group {21, 22, 23, 24} through the switch SW2, and then transmit or receive a radio-frequency (RF) signal though the test group {21, 22, 23, 24}. In addition, the processor 211 obtains a quality parameter of the test group {21, 22, 23, 24} according to a message or information in the received RF signal. Similarly, the transceiver 212 may also select the test group {25, 26, 27, 28} through the switch SW2, so that the processor may further obtain a quality parameter of the test group {25, 26, 27, 28}. Namely, in step S331, the control circuit 210 may link to the electronic device sequentially through the two test groups to obtain two quality parameters in response to each of the two test groups.

It should be noted that the quality parameter of the test group may be, for example, a received signal-strength indicator (RSSI) value or a connection rate. The control circuit 210 may calculate the connection rate of the test group according to a number of packets which are returned by the electronic device. In addition, as shown in step S332, the control circuit 210 may select one of the two test groups to be a specific test group according to two quality parameters. For example, the control circuit 210 may determine a test group which has better reception quality between the two test groups {21, 22, 23, 24} and {25, 26, 27, 28} according to the two quality parameters, and set the test group which has better reception quality to be a specific test group.

Moreover, as shown in step S340, the control circuit 210 determines whether the specific test group cannot be grouped, namely whether a grouping process for the specific test group is completed. For example, the wireless communication device 200 may select an antenna from each of the antenna arrays to be an optimal antenna for linking to the electronic device. Namely, when the grouping process for the specific test group is completed, a number of antennas which are adopted for linking to the electronic device is equal to a number of the antenna arrays in the wireless communication device 200. Accordingly, the control circuit 210 may determine whether the number of the antennas in the specific test group is equal to the number of the antenna arrays. In addition, when the number of the antennas in the specific test group is equal to the number of the antenna arrays, the control circuit 210 determines the grouping process for the specific test group is completed, and then determines the specific test group cannot be grouped. If the number of the antennas in the specific test group is not equal to the number of the antenna arrays, the control circuit 210 would determine the grouping process for the specific test group is not completed, and then determines the specific test group can be grouped.

For example, if the test group {21, 22, 23, 24} is set to be the specific test group in the step S330, then the control circuit 210 determines whether the specific test group can be grouped. Furthermore, when the specific test group can be grouped, as shown in step S350, the control circuit 210 performs a setting operation. Moreover, in the setting operation, the control circuit 210 groups the specific test group, and re-obtains the plurality of test groups according to the grouped specific test group.

For example, in terms of the detailed steps of the step S350, as shown in step S351, the control circuit 210 divides the specific test group into two sub-test groups. For example, the control circuit 210 divides the current specific test group {21, 22, 23, 24} into a sub-test group {21, 22} and a sub-test group {23, 24}, wherein the sub-test group {21, 22} includes antennas 21 and 21, and the sub-test group {23, 24} includes antennas 23 and 24. In addition, as shown in step S352, the control circuit 210 re-establishes the two test groups by using the sub-test group {21, 22} and the sub-test group {23, 24}. Namely, through the step S350, the two test groups would be re-set to be {21, 22} and {23, 24}. Moreover, the control circuit 210 would perform the scanning operation in the step S330 one more time to select one of the two current test groups {21, 22} and {23, 24} to be the specific test group.

If the test group {21, 22} is set to be the specific test group in the step S330, the control circuit 210 would determine that the specific test group {21, 22} can be grouped again through the step S340. At this time, the control circuit 210 would perform the setting operation in the step S350 one more time to re-establish the two test groups to be {21} and {22} according to the specific test group {21, 22}. In addition, the control circuit 210 would perform the scanning operation as shown in the step S330 one more time to select one of the two current test groups {21} and {22} to be the specific test group. If the test group {21} is set to be the specific test group in the step S330, the control circuit 210 would determine that the specific test group cannot be grouped again through the step S340. At this time, as shown in step S360, the control circuit 210 sets the antenna 21 in the specific test group {21} to be the optimal antenna for linking to an electronic device.

In other words, when the specific test group can be grouped, the control circuit 210 would perform the setting operation and the scanning operation repeatedly. Namely, the control circuit 210 would perform the setting operation and the scanning operation repeatedly, until the specific test group can no longer be grouped. Thus, the wireless communication device 200 may divide the current specific test group one more time into two test groups through the setting operation, and select a test group which has preferable reception quality from these two test groups which are divided again through the scanning operation. In this way, the wireless communication device 200 may gradually search the optimal antenna for linking to the electronic device from the antenna array 220, and further reducing a search time of the wireless communication device 200, and further reducing the burden of the wireless communication device 200.

For example, in terms of the antenna array 220 which has 8 antennas 21 to 28, the wireless communication device 200 would perform the scanning operation three times. In each of the scanning operations, the wireless communication device 200 uses two test groups to perform the wireless transmission with an electronic device. In other words, the wireless communication device 200 may perform 6 (i.e., 2+2+2) search operations to search the optimal antenna for linking to the electronic device. However, according to the conventional antenna search method, it would perform 8 search operations to search the optimal antenna for linking to the electronic device. Accordingly, when the number of the antennas in the antenna array 220 or the number of antenna arrays is increased, the improvement in the search time is increased through the antenna search method as shown in FIG. 3.

Figure 4:
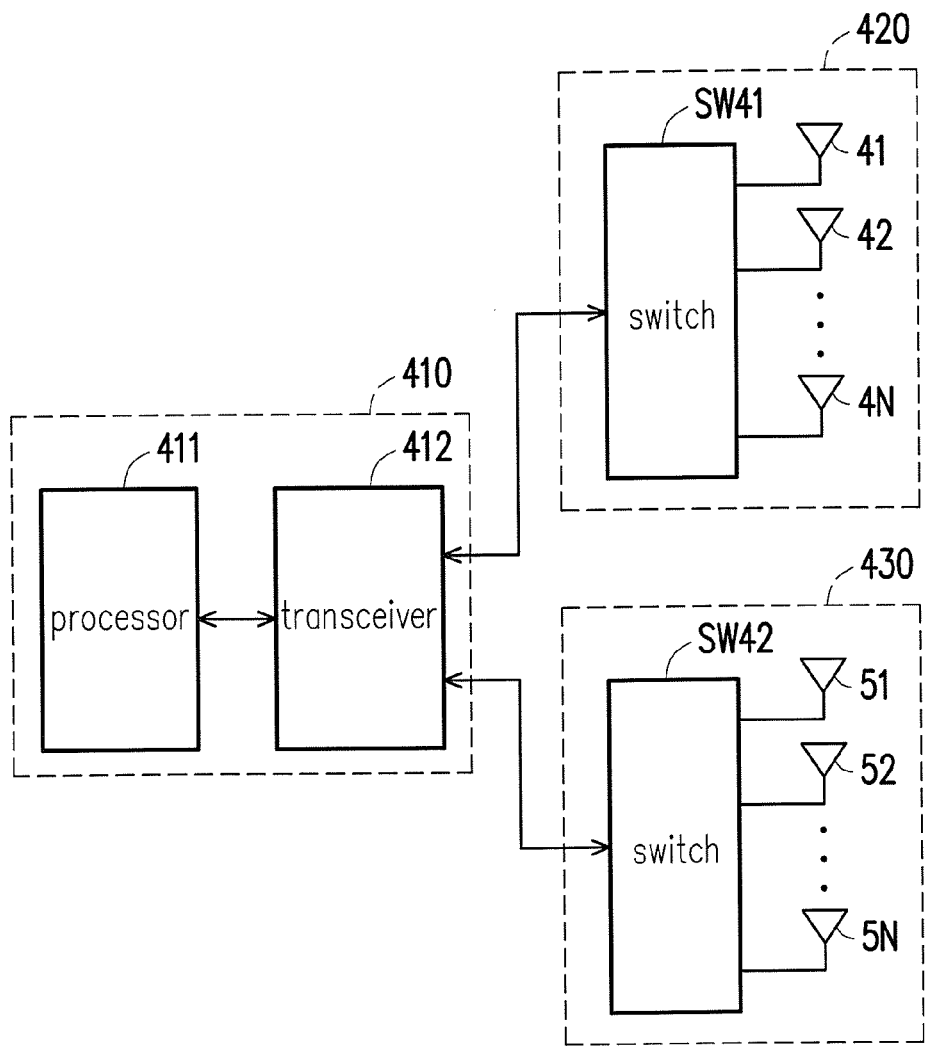
FIG. 4 is a schematic view illustrating a wireless communication device according to another embodiment of the invention.
Figure 5:
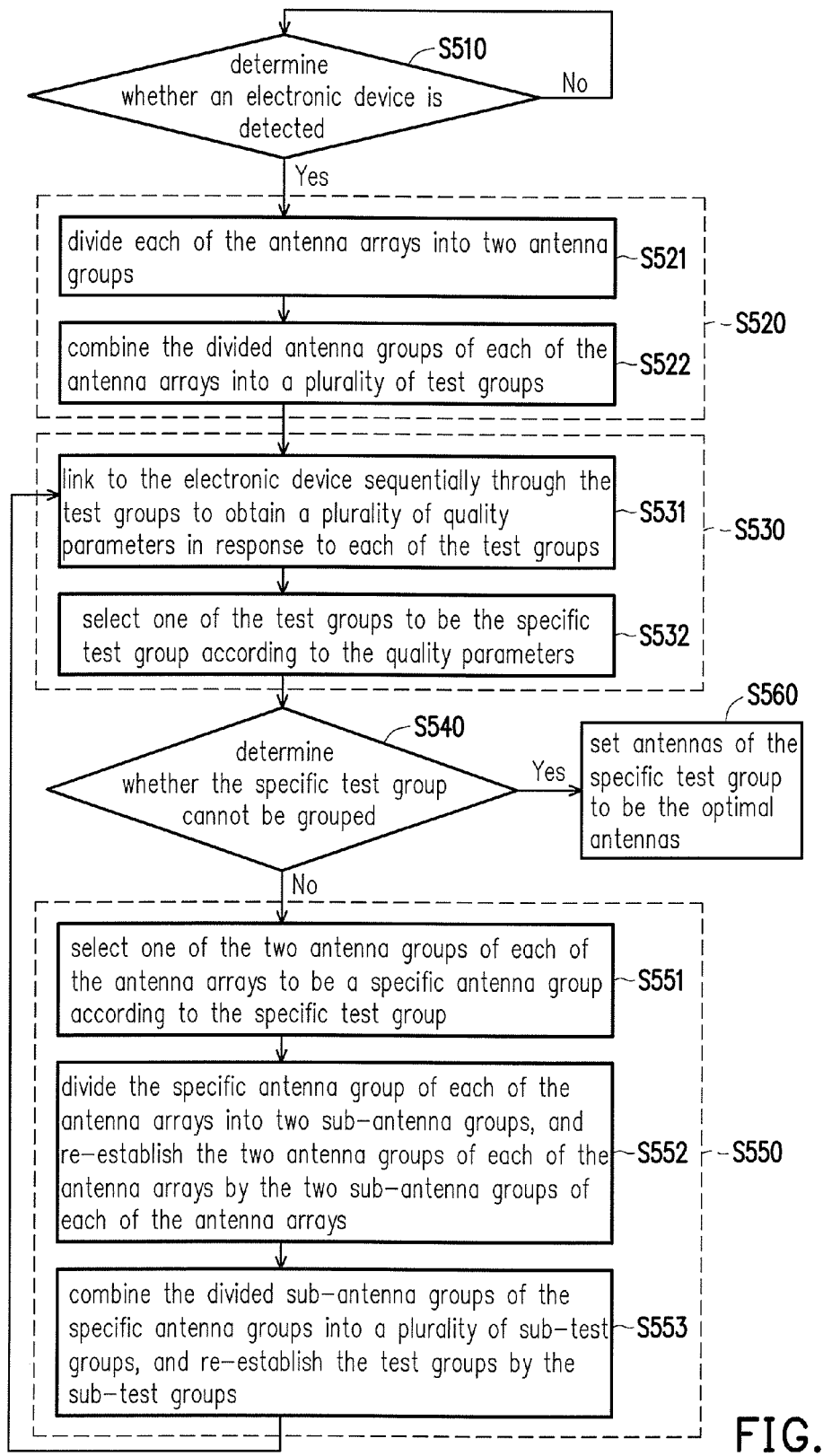
FIG. 5 is a flow chart illustrating an antenna search method according to another embodiment of the invention.

It should be noted that the embodiments of FIG. 2 and FIG. 3 mainly illustrate the operations of the wireless communication device 200 with a single antenna array 220, but the invention is not limited thereto. For example, FIG. 4 is a schematic view illustrating a wireless communication device according to another embodiment of the invention, and FIG. 5 is a flow chart illustrating an antenna search method according to another embodiment of the invention. An operation of the wireless communication device which has a plurality of antenna arrays is further described with reference to FIG. 4 and FIG. 5.

As shown in FIG. 4, a wireless communication device 400 includes a control circuit 410, an antenna array 420, and an antenna array 430. In addition, the control circuit 410 includes a processor 411 and a transceiver 412. The antenna array 420 includes a switch SW41 and a plurality of antennas 41-4N, and the antenna array 430 includes a switch SW42 and a plurality of antennas 51-5N. The processor 411 is electrically connected to the transceiver 412. Furthermore, the transceiver 412 may be switched to different antenna of the antenna array 420 through the switch SW41, and the transceiver 412 may be switched to different antenna of the antenna array 430 through the switch SW42. Moreover, in order to facilitate illustration, the following illustration is provided by assuming that the antenna array 420 and the antenna array 430 respectively includes four antennas (e.g., the antennas 41 to 44 and the antenna 51 to 54), and an operation of the wireless communication device 400 is illustrated by taking the above assumption as an example.

As shown in step S510, the wireless communication device 400 determines whether an electronic device (not shown) is detected. When the presence of the electronic device is detected, as shown in step S520, the control circuit 410 groups at least one antenna array to obtain a plurality of test groups. For example, in terms of the detailed steps of step S520, as shown in step S521, the control circuit 410 divides each of the antenna arrays into two antenna groups. For example, the antennas 41 to 44 of the antenna array 420 are divided into two antenna groups {41, 42} and {43, 44}, and the antennas 51 to 54 of the antenna array 430 are divided into two antenna groups {51, 52} and {53, 54}.

As shown in step S522, the control circuit 410 combines the divided antenna groups of the antenna arrays into the plurality of test groups, and each of the test groups respectively includes one of the two antenna groups in each of the antenna arrays. For example, the two antenna groups {41, 42} and {43, 44} of the antenna array 420 and the two antenna groups {51, 52} and {53, 54} of the antenna array 430 may be combined into $2^2$ test groups {41, 42, 51, 52}, {41, 42, 53, 54}, {43, 44, 51, 52}, and {43, 44, 53, 54}.

As shown in step S530, the control circuit 410 performs a scanning operation for linking to the electronic device by adopting the plurality of test groups, and selects one of the test groups to be a specific test group. For example, in terms of the detailed steps of the step S530, as shown in step S531, the control circuit 410 adopts the test groups {41, 42, 51, 52}, {41, 42, 53, 54}, {43, 44, 51, 52}, and {43, 44, 53, 54} one by one for linking to the electronic device so as to obtain quality parameters of these test groups. In terms of a detailed operation, the transceiver 412 may be electrically connected to the antennas 41 and 42 of the antenna array 420 through the switch SW41, and be electrically connected to the antennas 51 and 52 of the antenna array 430 through the switch SW42. In this way, the transceiver 412 is linked to the electronic device through the antennas 41, 42, 51, and 52, and further obtaining the quality parameter of the test group {41, 42, 51, 52}. Besides, as shown in step S532, the control circuit 410 may select one of the test groups to be the specific test group according to the quality parameters.

In addition, as shown in step S540, the control circuit 410 determines whether the specific test group cannot be grouped. When the specific test group may be grouped, as shown in step S550, the control circuit 410 performs a setting operation to group the specific test group, and re-obtains the plurality of test groups according to the grouped specific test group. For example, in terms of the detailed steps of step S550, as shown in step S551, the control circuit 410 selects one of the two antenna groups of each of the antenna arrays to be a specific antenna group according to the test groups. For example, when the test group {41, 42, 51, 52} is selected to be the specific test group, the control circuit 410 selects the antenna group {41, 42} to be the specific antenna group from the two antenna groups {41, 42} and {43, 44} of the antenna array 420 and selects the antenna group {51, 52} to be the specific antenna group from the two antenna groups {51, 52} and {53, 54} of the antenna array 430.

As shown in step S522, the control circuit 410 divides the specific antenna group of each of the antenna array into two sub-antenna groups, and re-establishes the two antenna groups of each of the antenna arrays by adopting these two sub-antenna groups of each of the antenna arrays. For example, the control circuit 410 divides the specific antenna group {41, 42} of the antenna array 420 into two sub-antenna groups {41} and {42}, and re-sets the two antenna groups of the antenna array 420 as {41} and {42}. Similarly, the specific antenna group {51, 52} of the antenna array 430 is divided into two sub-antenna groups {51} and {52}, such that the two antenna groups of the antenna array 430 are re-set to be {51} and {52}.

In addition, as shown in step S553, the control circuit 410 combines the divided sub-antenna groups of the specific antenna groups into a plurality of sub-test groups, and re-establishes the plurality of test groups by adopting the plurality of sub-test groups. For example, the control circuit 410 may combine the sub-antenna groups {41} and {42} and the sub-antenna groups {51} and {52} into $2^2$ test groups {41, 51}, {41, 52}, {42, 51}, and {42, 52}. In addition, the control circuit 410 re-sets the $2^2$ test groups by adopting the aforesaid $2^2$ test groups. Namely, the $2^2$ test groups would be re-set to be {41, 51}, {41, 52}, {42, 51} and {42, 52}.

Then, the control circuit 410 performs the scanning operation as shown in the step S530 again. In addition, in the scanning operation, the control circuit 410 adopts the test groups {41, 51}, {41, 52}, {42, 51} and {42, 52} for linking to the electronic device, and selects one of the plurality of test groups {41, 51}, {41, 52}, {42, 51} and {42, 52} to be the specific test group. Furthermore, if the test group {41, 51} is set to be the specific test group in the step S530, then the control circuit 410 would determine that the specific test group cannot be grouped through the step S540. At this time, as shown in step S560, the control circuit 410 sets up the antenna 41 and the antenna 51 of the specific test group {41, 51} to be optimal antennas for linking to the electronic device. Namely, the antenna 41 of the antenna array 420 and the antenna 51 of the antenna array 430 may be set to be the optimal antennas for linking to the electronic device. It is noted that the number of selected antenna is equal to the number of antenna array. In this embodiment, the number of the selected antenna is 2 and the number of antenna array is 2.

In other words, the control circuit 410 may perform the scanning operation and the setting operation repeatedly, until the specific test group can no longer be grouped. In addition, in terms of the antenna arrays 420 and 430 which respectively have four antennas, the wireless communication device 400 performs the scanning operation two times. And, in each of the scanning operations, the wireless communication device 400 adopts four test groups to perform the wireless transmission with the electronic device. In other words, the wireless communication device 400 may perform 8 (i.e., 4+4) search operations to search the optimal antennas for linking to the electronic device. Accordingly, when the wireless communication device 400 includes R antenna arrays and each of the antenna arrays includes N antennas, the wireless communication device 400 may search optimal antennas for linking to an electronic device through, approximately, $2^R \times \log_2 N$ search operations, wherein R is a positive integer, and N is an integer greater than 1. For example, when R=4 and N=8, the wireless communication device 400 may perform 48 search operations to search the optimal antennas for linking to the electronic device. However, according to the conventional antenna search method, it would perform 4096 search operations before the optimal antennas for linking to the electronic device are found. In other words, the antenna search method as described in the present embodiment may effectively reduce time for searching the optimal antennas for linking to the electronic device through the antenna arrays.

In addition, the number R of the antenna arrays and the number N of the antenna provided in each of the antenna arrays may also be in odd numbers. For example, the antenna array 220 in the wireless communication device 200 depicted in FIG. 2 may also include, for example, five antennas 21-25. In terms of operations, the antennas 21 to 25 may, first, be divided into two antenna groups {21, 22, 23} and {24, 25} in the step S320, such that the wireless communication device 200 adopts two test groups {21, 22, 23} and {24, 25} for linking to the electronic device in the step S330. Furthermore, when the test group {24, 25} is selected to be a specific test group in the step S330, the specific test group {24, 25} may be divided into two test groups {24} and {25} through the step S350, and the wireless communication device 200 may perform the step S330 again to select one of the two test groups {24} and {25} to be the specific test group. In other words, when R=1 and N=5, a mathematic equation $2^1 \times \log_2 5 = 2 \times 2.322$. At this time, the minimum number of times for search operations of the wireless communication device 200 is four (i.e., $2^1 \times 2$), and the maximum number of times thereof may be six (i.e., $2^1 \times 3$). Accordingly, when R=3 and N=5, a mathematic equation $2^3 \times \log_2 5 = 8 \times 2.322$. At this time, the minimum number of times for search operations of the wireless communication device 200 is 16 (i.e., $2^3 \times 2$), and the maximum number of times thereof may be 24 (i.e., $2^3 \times 3$).

In summary, the invention selects a specific test group from a plurality of test groups by adopting a scanning operation, and groups the specific test group through a setting operation to re-obtain the plurality of test groups. Accordingly, at least one optimal antenna for linking to an electronic device is searched from at least one antenna array through a scanning operation and a setting operation, thereby facilitating to shorten a search time of a wireless communication device and further reducing the burden of the wireless communication device.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A wireless communication device, for linking to an electronic device, and the wireless communication device comprising:

R antenna arrays, R being an integer greater than 1; and
a control circuit, coupled to the antenna arrays, the control circuit dividing each of the antenna arrays into two antenna groups and combining the divided antenna groups of the antenna arrays into $2^R$ test groups, each of the test groups comprising one of the two antenna groups of each of the antenna arrays, wherein in a scanning operation, the control circuit selects one of the test groups to be a specific test group, and in a setting operation, the control circuit groups the specific test group and re-obtaining the test groups according to the grouped specific test group, wherein the control circuit searches at least one optimal antenna for linking to the electronic device from the antenna arrays through the scanning operation and the setting operation.

2. The wireless communication device as claimed in claim 1, wherein, in the scanning operation, the control circuit links to the electronic device sequentially through the test groups to obtain a plurality of quality parameters in response to each of the test groups, and the control circuit selects one of the test groups to be the specific test group according to the quality parameters.

3. The wireless communication device as claimed in claim 2, wherein, in the setting operation, the control circuit selects one of the two antenna groups of each of the antenna arrays to be a specific antenna group according to the specific test group, the control circuit divides the specific antenna group of each of the antenna arrays into two sub-antenna groups, and re-establishes the two antenna groups of each of the antenna arrays by the two sub-antenna groups of each of the antenna arrays, and the control circuit combines the divided sub-antenna groups of the specific antenna groups into a plurality of sub-test groups, and re-establishes the test groups by the sub-test groups.

4. The wireless communication device as claimed in claim 1, wherein the control circuit determines whether a grouping process for the specific test group is completed according to a number of antennas in the specific test group and a number of the antenna arrays, when the grouping process for the specific test group is not completed, the control circuit performs the scanning operation and the setting operation repeatedly, when the grouping process for the specific test group is completed, the control circuit sets at least one antenna of the specific test group to be the at least one optimal antenna.

5. The wireless communication device as claimed in claim 1, wherein the control circuit comprises a processor and a transceiver, the antenna arrays comprises at least one switch, the transceiver selects the test groups one by one through the at least one switch for linking to the electronic device through the test groups one by one, and the processor reads signals from the transceiver to select one of the test groups to be the specific test group.

6. An antenna search method, adapted to a wireless communication device and comprising:
grouping R antenna arrays by a control circuit of the wireless communication device, wherein R is an integer greater than 1, and the step of grouping the antenna arrays comprises:
dividing each of the antenna arrays into two antenna groups by the control circuit; and
combining the divided antenna groups of the antenna arrays into $2^R$ test groups by the control circuit, wherein each of the test groups comprises one of the two antenna groups of each of the antenna arrays;
performing a scanning operation by the control circuit to select one of the test groups to be a specific test group;
performing a setting operation by the control circuit to group the specific test group and re-obtain the test groups according to the grouped specific test group; and
searching at least one optimal antenna from the antenna arrays through the scanning operation and the setting operation performed by the control circuit.

7. The antenna search method as claimed in claim 6, wherein the step of performing the scanning operation by the control circuit to select one of the test groups to be the specific test group comprises:
linking to an electronic device sequentially through the test groups to obtain a plurality of quality parameters in response to each of the test groups; and
selecting one of the test groups to be the specific test group according to the quality parameters.

8. The antenna search method as claimed in claim 7, wherein the quality parameters comprises connection rates and received signal-strength indicator values when the test groups link to the electronic device.

9. The antenna search method as claimed in claim 6, wherein the step of performing the setting operation by the control circuit to group the specific test group and re-obtain the test groups according to the grouped specific test group comprises:
selecting one of the two antenna groups of each of the antenna arrays to be a specific antenna group according to the specific test group;
dividing the specific antenna group of each of the antenna arrays into two sub-antenna groups, and re-establishing the two antenna groups of each of the antenna arrays by the two sub-antenna groups of each of the antenna arrays; and
combining the divided sub-antenna groups of the specific antenna groups into a plurality of sub-test groups, and re-establishing the test groups by the sub-test groups.

10. The antenna search method as claimed in claim 6, wherein the step of searching the at least one optimal antenna through the scanning operation and the setting operation performed by the control circuit comprises:
determining whether a grouping process for the specific test group is completed according to a number of antennas in the specific test group and a number of the antenna arrays;
performing the scanning operation and the setting operation repeatedly when the grouping process for the specific test group is not completed; and
setting at least one antenna of the specific test group to be the at least one optimal antenna when the grouping process for the specific test group is completed.

* * * * *